July 2, 1968  T. CARMICHAEL ET AL  3,390,698
RESERVE FUEL SUPPLY SYSTEMS
Filed Sept. 7, 1966  3 Sheets-Sheet 3

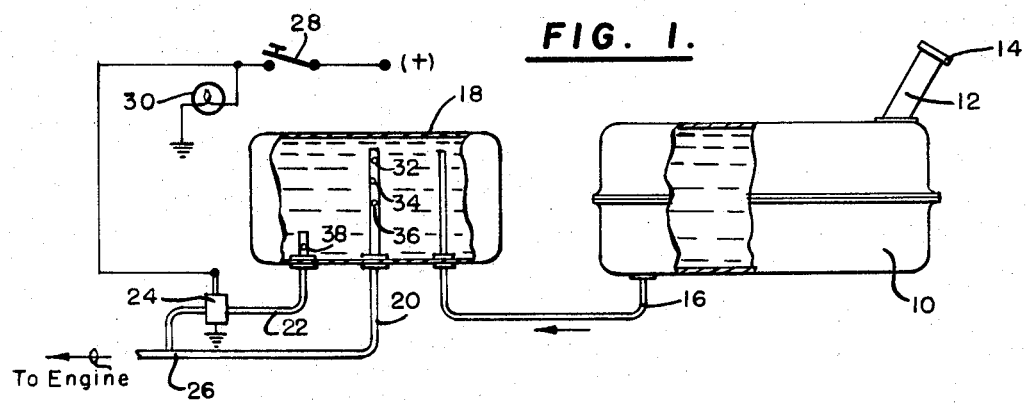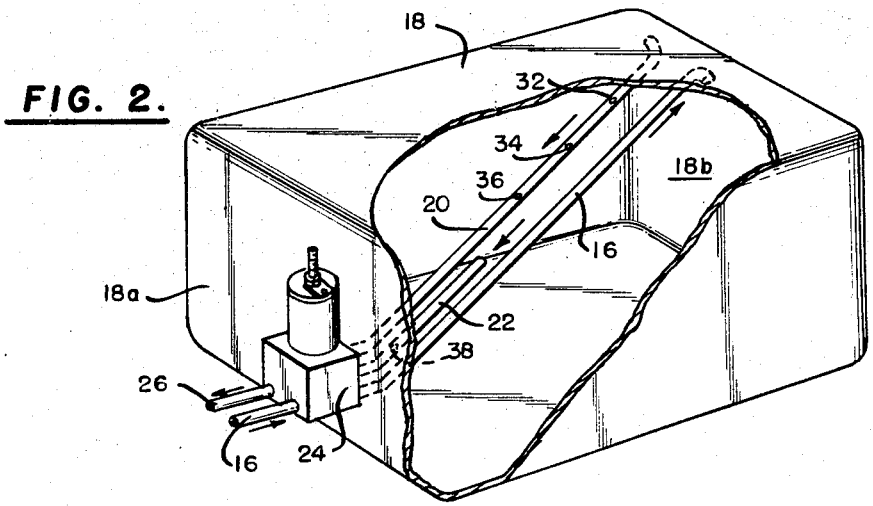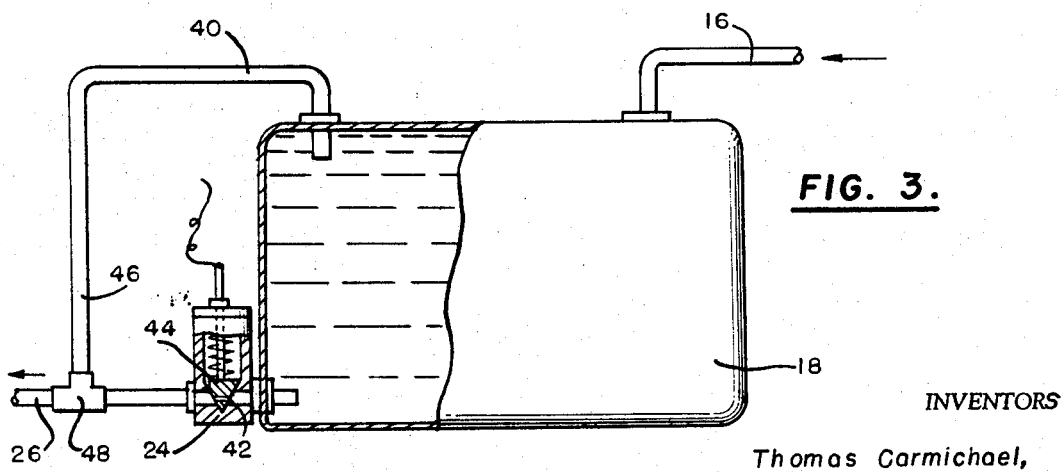

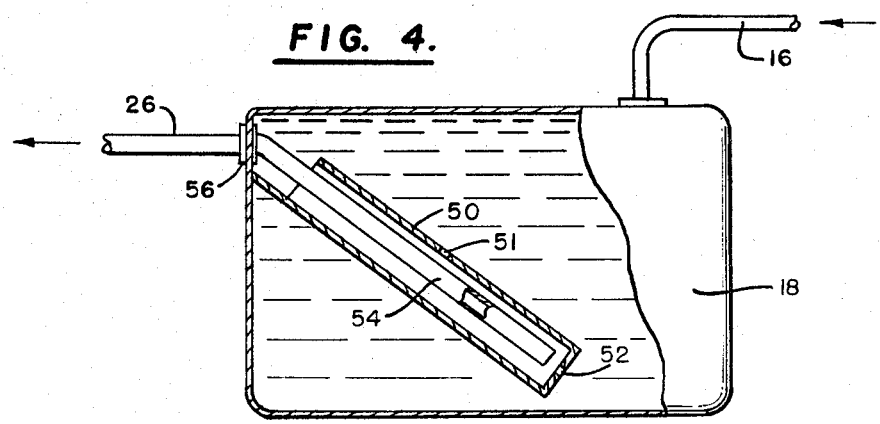
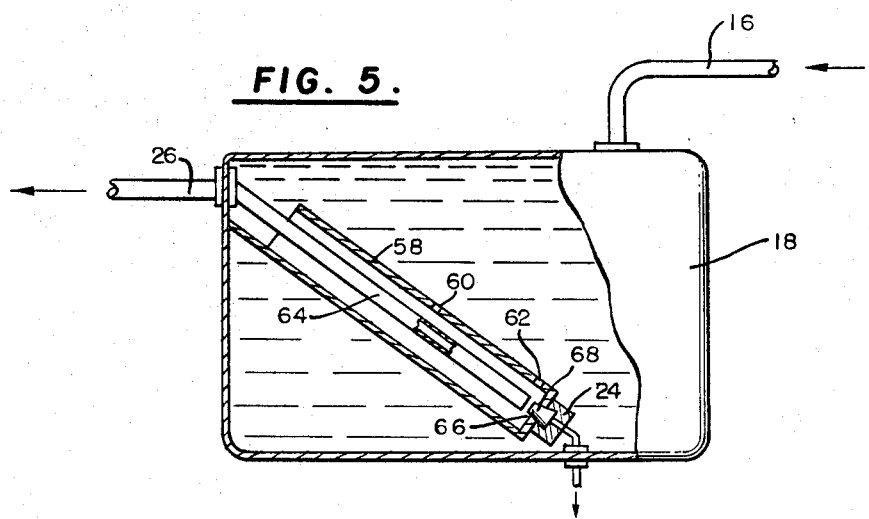
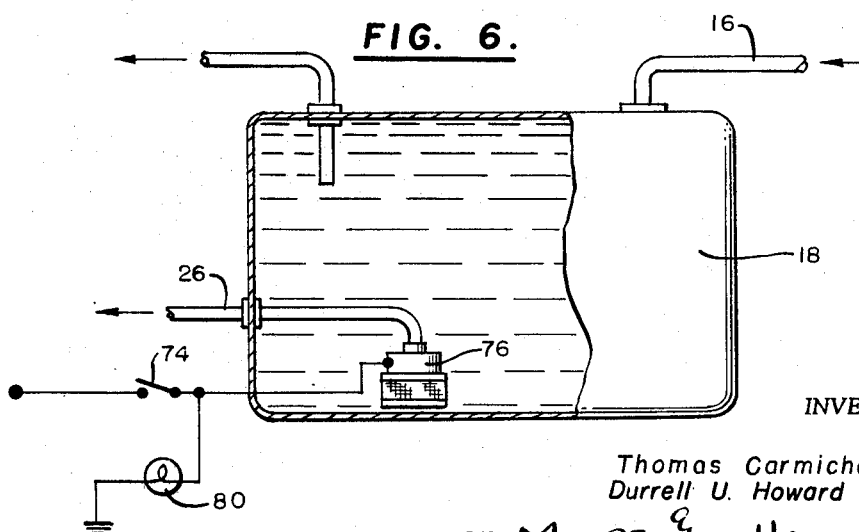

INVENTORS
Thomas Carmichael,
Durrell U. Howard
BY Moore & Hall
ATTORNEYS

United States Patent Office 3,390,698
Patented July 2, 1968

3,390,698
RESERVE FUEL SUPPLY SYSTEMS
Thomas Carmichael, 2311 Blanton Drive 78209, and Durrell U. Howard, 306 Krameria Drive 78213, both of San Antonio, Tex.
Filed Sept. 7, 1966, Ser. No. 577,625
8 Claims. (Cl. 137—567)

ABSTRACT OF THE DISCLOSURE

The disclosure relates to a reserve fuel supply system for an internal combustion engine. A reserve fuel tank is normally maintained full of fuel from the main fuel tank and has therein at least one upstanding tube whose open, upper end is positioned near the top of the tank so that an unrestricted flow of fuel is provided to the engine when the reserve tank is full of fuel. When the fuel level drops below the level of the open upper end of the tube, the flow is restricted as by means of one or more small orifices in the side of the tube, thereby permitting only impaired operation of the engine. A full flow of fuel to the engine can nevertheless still be obtained, as for emergency purposes, by actuating a valve which opens a port that otherwise blocks flow of fuel to the engine.

It is well known that a conventional fuel gauge does not provide a reliable and accurate measure of the amount of fuel remaining in the fuel tank of a vehicle. Also, because such fuel gauges ordinarily provide only a visual display, it is a common occurrence for the driver to ignore a visual indication of low fuel supply until such time that the engine stalls.

Because of the considerable inconvenience which results when the fuel supply is unexpectedly exhausted, various reserve fuel supplies have been devised to provide an auxiliary supply of fuel once the main source has become depleted. However, it is also a frequent occurrence for the driver to ignore the fact that he is operating on a limited, auxiliary fuel supply so that eventually the auxiliary supply is also exhausted. Moreover, in the use of a reserve fuel supply system having an auxiliary tank and a manual selector means for selecting between the main and auxiliary tanks, it frequently also happens that one operator will switch the system to the auxiliary fuel supply when the fuel in the main tank becomes exhausted, and a subsequent operator of the vehicle, not being aware that the fuel supply system has been switched to the auxiliary tank, will then continue to operate the vehicle to the point where the auxiliary supply is exhausted and the vehicle stops operating.

In the prior, copending application of D. U. Howard, Serial No. 409,218, filed November 5, 1964, now Patent Number 3,326,264, it is described that a common characteristic of these prior art fuel supply reserve systems is that operation of the vehicle continues in an entirely unimpaired fashion while operating with the reserve fuel supply, thereby making it readily possible for the operator to ignore completely the fact that his main fuel supply is exhausted and that he is now operating with the limited amount of fuel available in the reserve supply. The various systems disclosed in the aforesaid pending patent application S.N. 409,218 overcome this problem by providing a reserve fuel supply which automatically comes into use when the main supply is depleted, but with engine performance automatically impaired when the reserve supply is being drawn upon, thereby making it virtually impossible for the driver to ignore the warning of impending fuel exhaustion. The systems of the prior patent application are further constructed so that the impairment of performance becomes more severe with increasing withdrawal of fuel from the reserve supply, and the impairment of performance is primarily evidenced by an inability to maintain a vehicle speed above a predetermined level. As a practical matter, the fuel supply to the engine is decreased in successive stages as the reserve fuel supply is diminished with the result that, as the fuel reserve nears exhaustion, the vehicle is able to operate only at a very slow speed.

Although the various embodiments of fuel supply systems disclosed in the aforesaid patent application S.N. 409,218 have proved to be entirely practical, it has nevertheless been found that a condition may arise wherein exhaustion of the main fuel supply, accompanied by the drawing of fuel from the reserve supply, may pass unnoticed by the driver under conditions of low speed operation. Thus, assuming that the vehicle is being used in heavy city traffic, for example, with the vehicle at no time operating at a speed above perhaps ten miles per hour, if the main tank becomes exhausted at such time, with fuel being drawn then from the reserve supply, the reduced amount of fuel that can be drawn from the reserve supply may still be sufficient to permit normal operation of the engine at speeds of ten miles per hour or less. However, if it is assumed that the operator then emerges from the heavy stream of traffic onto a high speed expressway, he will then suddenly find that enginne performance has been sharply reduced because the vehicle is now operating with the reserve supply. To overcome this, it is provided that a manual control will be available to the driver which permits an uninterrupted, normal supply of fuel to the engine for a limited time even though the fuel is being drawn from the reserve tank. This will permit the vehicle to operate for a short time at normal vehicle speeds which is highly desirable when the vehicle is operating on a high speed road. This invention also provides that a visual or audible signal indication such as a flashing red light will be displayed on the instrument panel of the vehicle to warn the operator that he is operating on the reserve fuel supply even though engine performance is now apparently normal. The system of this invention further provides that if the fuel supply is not quickly replenished so that the fuel remaining in the reserve tank is depleted below a predetermined level, then engine performance will eventually still be drastically curtailed by permitting only a very small amount of fuel to reach the engine even though the operator has already operated the manual control to permit a normal rate of fuel flow from the reserve supply. In other words, if the operator attempts to continue operation of the vehicle even in the face of the flashing light on the instrument panel and with knowledge that he is operating on the reserve supply, he will nevertheless not be able to exhaust the reserve supply of fuel at high speed but will soon reach the condition wherein the vehicle can only move at minimum speed from the highway to a filling station.

It is thus an object of this invention to provide a reserve fuel supply system for a vehicle which is of the type resulting in impaired engine operation when the main fuel supply has been exhausted to thereby provide a continuous warning to the operator that the fuel supply is at a dangerously low level, together with the means for permitting, in response to manual actuation of a control means, normal engine operation for a limited time until the fuel supply has been further depleted, at which time only minimum speed operation of the vehicle can take place.

It is an additional object of the invention to provide a reserve fuel supply system in which the reserve fuel supply is automatically brought into use when the main fuel tank is exhausted and wherein a manually responsive means is provided to permit normal engine operation at times even though, under ordinary circumstances, only reduced speed operation is possible when fuel is being drawn from the reserve supply when the main supply has been exhausted.

Other objects, purposes, and characteristics of the present invention will in part be obvious from the drawings and in part will be pointed out as the description of the invention progresses.

In describing the invention in detail, reference will be made to the accompanying drawings in which like reference characters designate corresponding parts throughout the several views and in which:

FIGURE 1 is an illustration of one embodiment of the invention illustrating the main tank, the auxiliary fuel tank, the manual switch control and a warning signal;

FIGURE 2 illustrates a modification of the invention which permits placement of the auxiliary fuel tank either vertically or horizontally in a vehicle;

FIGURE 3 illustrates an additional modification of the invention;

FIGURE 4 illustrates an alternative embodiment of the invention;

Figure 7:
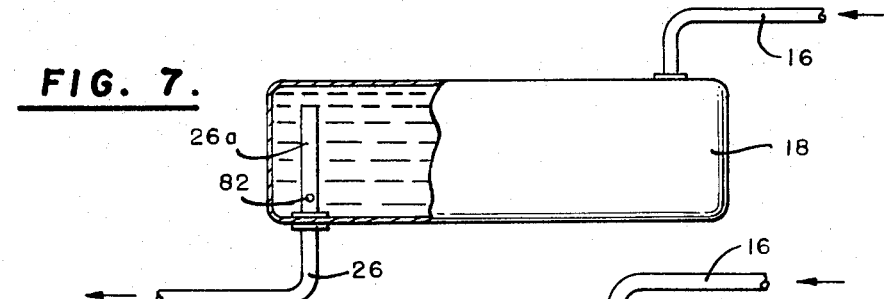
Figure 8:
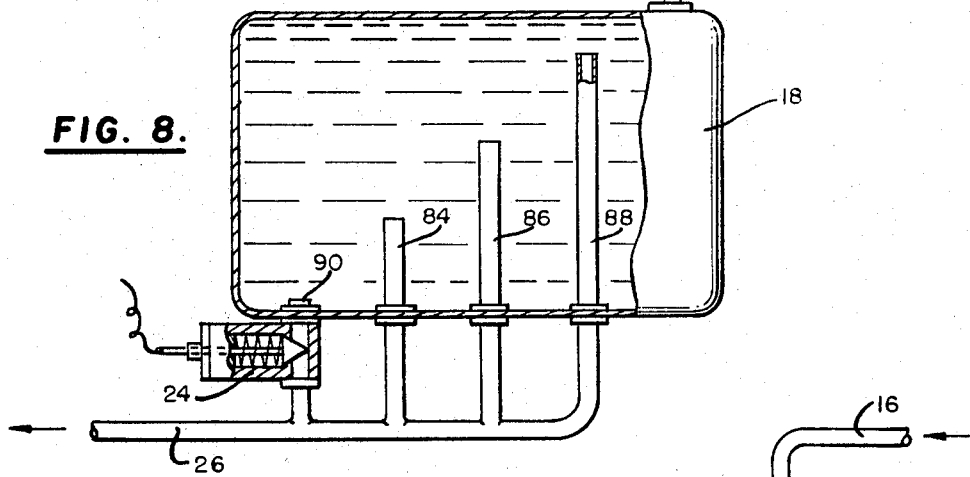
Figure 9:
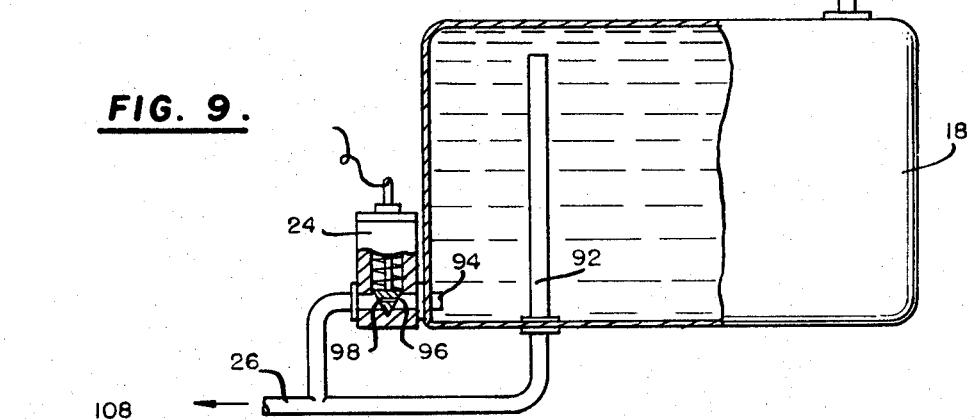

FIGURE 5 discloses a further modification similar to that in FIGURE 4 but additionally employing an electromagnetically operated valve;

FIGURE 6 is a modification of the invention disclosing the use of an electric pump within the reserve fuel tank;

FIGURE 7 illustrates a simplified version of the invention;

FIGURE 8 illustrates a further modification of the present invention employing a plurality of upstanding tubes in the auxiliary fuel tank;

FIGURE 9 illustrates an additional embodiment of the invention; and

Figure 10:
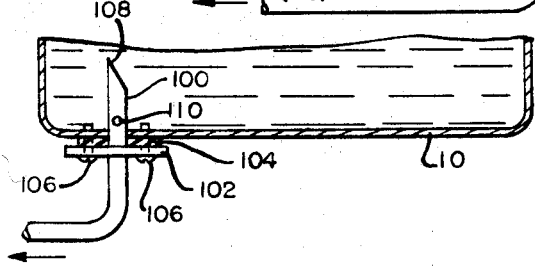

FIGURE 10 illustrates an adaptor which is intended for use with a conventional fuel tank.

FIGURE 1 discloses a conventional main fuel tank for a vehicle or the like having a filler neck 12 and cap 14 and with a fuel line 16 connected to and communicating with the interior thereof. The auxiliary fuel tank 18 may be located at any convenient place in the vehicle and may, in the case of an ordinary motor car, be located in the trunk or other suitable storage space, preferably being secured to the sheet metal of the car by means of encircling straps (not shown) and sheet metal screws or other suitable fasteners. The fuel line 16 extends into the interior of auxiliary tank 18 and extends upwardly toward the top of the tank. It should be understood, however, that fuel line 16 may run directly into the top or side walls of the auxiliary tank 18 even though shown in FIGURE 1 as entering the bottom wall of the tank. It will also be appreciated that suitable gaskets or the like will be provided at the point of entry of the fuel line 16 into the auxiliary tank 18 to prevent fuel leakage.

Extending into the interior of tank 18 is an outlet fuel line 20 whose upper end extends to a point near the top of the tank so that its uppermost, open end is ordinarily at all times below the level of fuel in the tank 18 provided the latter is full, or substantially full, of fuel. A third fuel line 22 extends also into the bottom of the tank but does not extend upwardly nearly as far as does the tube 20. Tube 22 is also open at its uppermost end and extends exteriorly of tank 18, to an electromagnetically operated valve 24 which controls the flow of fuel through tube 22 and into main fuel supply line 26 which conducts fuel to the engine. Valve 24 is actuated in response to the completion of an electrical circuit resulting from closure of switch contact 28 which is preferably mounted on or adjacent the instrument panel of the vehicle. Actuation of this switch contact 28 not only completes a circuit from the terminal (+) to ground through the solenoid (not shown) associated with valve 24, but also completes a circuit to illuminate a lamp 30 which is preferably also mounted on the instrument panel of the vehicle so that a continuous indication is given to the operator that the circuit is closed for energization of valve 24.

Tube 20 is not only hollow, open at its upper end, as previously described, but also is provided with a number of bores 32, 34, 36 located at various intervals along its length. Tube 22, in addition to having an open upper end, is provided with a single bore 38 located at a point only slightly above the bottom of the tank. Preferably, the upper end of tube 22 is below the level of the bottommost bore 36 in tube 20.

Operation of the reserve fuel supply system of FIGURE 1 is as follows:

Under normal conditions, with a supply of fuel in main fuel tank 10, the production of a negative pressure or vacuum at line 26 produced by the fuel pump (not shown) associated with the vehicle not only draws fuel into the fuel line 20 through its open upper end as well as through bores 32, 34 and 36, but also tends to produce a vacuum within tank 18, and this vacuum tends to suck fuel from the main tank 10, through fuel line 16, into auxiliary tank 18, thereby keeping the latter full of fuel. Hollow tube 20 is of such a diameter that a full flow of fuel can take place through its open upper end so that normal engine operation occurs as long as auxiliary tank 18 remains full which it will necessarily do provided that there is a supply of fuel in the main tank 10.

When the supply of fuel in main tank 10 has been exhausted, the fuel supply in auxiliary tank 18 will no longer be replenished as it is drawn through fuel line 20 into the engine. When the level of fuel in tank 18 reaches a point where there can no longer be a steady flow of fuel into the open upper end of tube 20, then fuel can be drawn into tube 20 only through the small bores 32, 34, 36, and these are made sufficiently small so that the cumulative fuel flow through these bores will only permit operation of the engine at a speed below its normal maximum, such as a speed of thirty miles per hour. If the operator attempts to drive the vehicle at a higher rate of speed, the fuel supply becomes inadequate for operation at such high speed and a quantity of air is drawn into the carburetor in addition to the fuel so that sputtering of the engine will occur. This provides a positive and continuous indication to the operator that the main fuel supply is exhausted and that the engine is now drawing fuel from the reserve fuel supply.

If the level of fuel in auxiliary tank 18 is permitted to be drawn to a still lower level, eventually the level will become so low that fuel cannot pass through bore 32 into tube 20, but only through the lower bores 34 and 36. As a result, the maximum permissible fuel flow is further reduced, and the speed of the engine must be further reduced to avoid sputtering and intermittent operation. A still further reduction in fuel flow occurs when the level drops below bore 34 since fuel can then enter tube 20 only through the lowest bore 36, and a corresponding further reduction in speed must be made to ensure continued operation of the engine. If this further warning is not heeded with the result that the fuel level drops below the level of bore 36, then no further fuel can be drawn in through tube 20 and the engine will quit.

It will be noted, however, that the open upper end of tube 22 is below the level of bore 36 in tube 20 so that fuel can enter the open end of tube 22 even though the level of the auxiliary fuel supply has been lowered to a level below that which will permit flow of fuel through bore 36 into tube 20. However, under ordinary circumstances, electromagnetically operated valve 24 is closed and will not permit the flow of fuel through tube 22 into the main fuel line 26. It is only when the electromagnetic valve 24 is operated by closure of switch 28 that this valve will open and permit fuel to flow through tube 22 into main fuel line 26. In operation, therefore, the operator may obtain a full flow of fuel to the engine to permit normal operation even when the auxiliary tank 18 is not full of fuel. As long as the level of fuel is above the upper level of the open end of tube 22, a full rate of fuel flow can be drawn through tube 22 provided that electromagnetic valve 24 is open. When valve 24 is opened by closure of contact 28, a continuous visual indication of this fact is given to the operator by the energization of lamp 30. Preferably, lamp 30 is operated in a flashing manner to provide an even more positive indication to the operator of the fact that valve 24 is actuated and that fuel is being withdrawn from the auxiliary tank with an unrestricted rate of flow.

If the operator of the vehicle, having operated electromagnetic valve 24, ignores the warning given to him by the flashing signal light 30, the fuel level will then eventually fall below the level of the open upper end of tube 22. When this happens, fuel can be drawn into tube 22 only through the bore 38. This bore is purposely made quite small so that the small quantity of fuel remaining can be used only at a very low rate which will permit operation of the engine at a correspondingly low speed only, sufficient to enable the vehicle to travel at very low speeds to the nearest available filling station but not permitting operation in any manner resembling normal vehicle operation. Presumably, this final warning of impending exhaustion of all remaining fuel will prove adequate to require the driver to pay heed and immediately take steps to replenish the fuel supply.

When the reserve fuel supply is first installed in a vehicle, the auxiliary tank 18 is ordinarily empty of fuel initially. However, the fuel system generally contains sufficient fuel to permit the engine to be started, and as soon as this occurs, the fuel pump operates and fuel is drawn into the auxiliary tank 18 from the main fuel tank 10. If the amount of fuel drawn into tank 18 is insufficient to permit continued operation of the engine because the level is not high enough to provide an adequate flow of fuel through the orifices of tube 20, the operator may actuate valve 24 to provide a virtually unrestricted flow of fuel through line 22 to the engine.

FIGURE 2 illustrates an alternative form of the auxiliary fuel tank 18 of FIGURE 1. Each of the three tubes 16, 20 and 22 extends at an angle upwardly from the bottom of the tank toward the top and toward the opposite side wall. It will be appreciated that this arrangement of the tubes within the tank permits placement of the tank 18 in either the position shown in FIGURE 2 or permits positioning of the tank with the surface 18a at the bottom and with surface 18b on top. The electromagnetic valve 24 is shown as being affixed to the side wall 18a, and the outlet side of valve 24, whose inlet side is connected to tube 22, is joined internally of the valve casing with tube 20 so that only the main fuel line 26 is shown as emerging from the valve casing. Inlet fuel line 16 extends through the valve casing directly into the interior of the tank.

In the embodiment of the invention illustrated in FIGURE 3, the auxiliary tank 18 again receives fuel from the inlet fuel line 16. An outlet fuel line 40 also communicates with the interior of the tank through the top wall, permitting a free flow of fuel through line 40 to the main fuel line 26 extending to the engine.

As long as fuel is supplied to tank 18 through inlet line 16 as result of the withdrawal of fuel through line 40 to the engine, tank 18 remains filled and a full, normal supply of fuel is made available to the engine. However, when the supply of fuel in the main tank is exhausted so that no further fuel can be drawn into auxiliary tank 18 through input line 16, the level of fluid in the auxiliary tank 18 will soon drop below the level of the open end of tube 40, and no further fuel can be supplied to the engine from this line 40. Thereafter, the only fuel which can be supplied to the engine is that which passes through a small orifice 42 provided in member 44 of valve 24 which permits the flow of a small amount of fuel from tank 18 through line 46, to main fuel line 26 through the T-connection 48. The amount of fuel that can pass through orifice 42 is dependent upon the level of fuel in auxiliary tank 18 since the greater the level of fluid, the greater the pressure head at the bottom of the tank and thus the greater the amount of fuel that can pass through orifice 42 into main gas line 26. As a result, once the level of fuel in auxiliary tank 18 has reached the point where no further fuel can pass through line 40, then only a reduced fuel supply is available to the engine through orifice 42 and the amount of fuel which is thus made available reduces gradually as the level of fuel diminishes in tank 18, thereby producing a decrease in engine performance with increased use of the reserve fuel supply.

If, however, the vehicle operator requires a normal supply of fuel to the engine as may be necessary in any emergency condition, then the electromagnetic valve 24 may be energized to raise the valve element 44 and permit an unobstructed flow of fuel from tank 18, through valve 24 and line 46 to main fuel line 26. As with the embodiment of FIGURE 1, energization of the valve will be accompanied by the illumination of a signal lamp on the instrument panel, preferably with a flashing red light or other suitably distinctive signal.

A further embodiment of the invention is shown in FIGURE 4. In FIGURE 4, the auxiliary fuel tank is again supplied with fuel from inlet line 16 which communicates with the main fuel tank (not shown). In the interior of tank 18 is a hollow tube 50 which may be held in a slanted position as shown, by being welded to either the side wall of the tank or to the bottom of the tank, or both. Tube 50 is open at the top and is provided with a small orifice 51 substantially intermediate its ends, together with a small orifice 52 at or near its bottom. Within tube 50 there is positioned a gas line 54 which comprises a hollow tube open at the bottom. Tube 54 extends through a wall of tank 18 at 56, and it will be appreciated that sealing means including gaskets will be used at 56 to prevent fuel leakage.

As long as the fuel supply of auxiliary tank 18 is replenished through input line 16, tank 18 remains full as fuel is drawn into line 54 and supplied to the engine. While tank 18 is full, hollow tube 50 is at all times kept full of fuel since the fuel can travel without restriction into the large upper open end of tube 50 and thence through the open end at the bottom of tube 54. However, if the supply of fuel in auxiliary tank 18 is depleted to a level below that at which fuel can spill over and into the open upper end of tube 50 into the interior of such tube 50, the only fuel that can be siphoned out of tube 50 which acts as a sump and into the interior of tube 54 is that which will pass through the small orifices 51 and 52. Accordingly, upon the exhaustion of fuel in the main fuel tank and a reduction in level of the auxilary fuel supply in tank 18 to the point where fuel can be drawn into the center of tube 50 only through orifices 51 and 52, there will be an impairment of engine performance permitting engine operation at only reduced speeds. When the level of fuel in tank 18 is further reduced so that fuel can no longer enter tube 50 through orifice 51, engine speed must again be reduced since fuel can then enter only through the lower orifice 52. Incidentally, although tube 50 and gas line 54 are shown as being slanted within tank 18, there is no necessity that these elements be in a slanted position since they can as well be disposed vertically within tank 18. Also, although two orifices 51 and 52 are shown in FIGURE 4, it will be apparent that additional orifices may be provided at different levels or that only a single orifice may be provided if desired.

FIGURE 5 illustrates a form of the invention which is generally similar to that of FIGURE 4 but employs an electromagnetically operated valve 24. Positioned within tank 18 is tube 58 which may be secured, as by welding, to the side wall and/or bottom of the tank and with this tube 58 being open at the top and also provided with an orifice 60 at a location intermediate its top and bottom ends, together with an additional orifice 62 located near its bottom end. Disposed within tube 58 is a fuel line 64 comprising a hollow tube whose lower end is open. The outer hollow tube 58 has a relatively large aperture 66 at or near its bottom end which may be selectively opened or closed in accordance with the energization of an electromagnetically operated valve 24. As illustrated in FIGURE 5, when the valve is in its normal, de-energized condition, the valve member 68 completely closes the large bottom orifice 66 in tube 58; however, when valve 24 is energized, this large bottom orifice is opened.

If the main fuel tank contains a supply of fuel, then the withdrawal of fuel through main gas line 26 causes the fuel supply in tank 18 to be constantly replenished so that this tank remains full of fuel and tube 58 then also is constantly filled with fuel. The fuel in tube 58 can then readily be drawn up into the hollow fuel line 64 and fed via main fuel line 26 to the engine. If the supply of fuel in the main tank is exhausted, the level of fuel in tank 18 eventually drops below the level of the open upper end of tube 58 so that the fuel supply within tube 58 is eventually depleted. Thereafter, fuel can enter through tube 58 only through the small orifices 60 and 62.

If the fuel supply is not replenished, the level of fuel in tank 18 will eventually drop below the level of orifice 60 so that further intake of fuel can only take place through orifice 62. When fuel can be drawn through both orifices 60 and 62, a reduced, medium speed of the engine is possible; however, with the further depletion of the fuel supply permitting entry of fuel only through the lower orifice 62, fuel flow is more restricted and engine speed must be reduced still further to maintain operation. If the operator encounters an emergency condition which requires that a full flow of fuel be restored, this can be accomplished by energization of valve 24, the opening of which permits a full supply of fuel to be drawn into the large orifice 66 at the bottom of tube 58. As with the previous embodiments employing an electromagnetic valve, energization of valve 24 is preferably accompanied by the illumination of a flashing light on the instrument panel of the vehicle to warn the driver that he is in imminent danger of exhausting the remaining fuel supply in the auxiliary tank 18. Moreover, as with the embodiment of FIGURE 4, the tubes 59 and 64 may be disposed vertically within tank 18, and a greater or lesser number of orifices may be provided in sump tube 59 than are shown in FIGURE 5.

A further embodiment of the invention is illustrated in FIGURE 6 which shows the auxiliary fuel tank 18 as again receiving fuel from the main fuel tank through an inlet fuel line 16. Once the level of fuel in tank 18 drops to a level below the open end of tube 26, further fuel will not be supplied to the member 70 unless the switch 74 is closed which supplies energy to an electric fuel pump 76 located within the tank and having an inlet end disposed near the bottom of the tank. Energization of the fuel pump 76 results in a flow of fuel through tube 78 to the engine downstream of the regular fuel pump (not shown). This makes possible a continued flow of fuel to the engine when the main gas tank is empty and also makes possible a continued flow in the event of a malfunction in the regular fuel pump. The reason for connecting tube 78 to the fuel supply system downstream of the regular fuel pump is to prevent the pump 76 from pumping fuel back to tank 18 when the regular fuel pump is inoperative. Since the operation of this pump in response to closure of switch 74 is accompanied by the illumination of a distinctive signal lamp 80, a constant warning is presented to the driver that he is operating on the reserve fuel supply and that the main tank must accordingly be filled promptly if complete fuel exhaustion is to be avoided.

FIGURE 7 illustrates a simplified version of the invention in which the auxiliary tank 18 receives fuel from the main tank via inlet gas line 16. The outlet gas line 26 has a portion 26a which extends into the interior of the tank, and is shown in FIGURE 7 as extending from the bottom wall of the tank upwardly toward the top of the tank. Tube 26a has a small orifice therein at 82 near the bottom of the tank.

Under normal conditions, tank 18 is full of fuel and an unrestricted flow of fuel is provided through the open upper end of tube 26a and into main gas line 26 to the engine. When the level of fuel in tank 18 drops below that which will permit a free flow of fuel into the open upper end of tube 26a, further fuel can be supplied to the engine only through the small orifice 82 which is purposely made quite small so that only a restricted flow of fuel is provided and engine operation can be maintained only at low speeds. In this embodiment, the engine speed which can be maintained under these conditions is dependent upon the amount of fuel in tank 18 since, with higher fuel levels, a higher pressure head is produced and a greater amount of fuel flow is permissible. When the fuel level gets to a point just above the orifice 82 near the bottom of tank 18, only very low speed in operation of the engine is permissible; however, this low speed operation will nevertheless ordinarily permit the vehicle to be operated slowly to the nearest filling station or at least to a safe place out of the stream of traffic.

FIGURE 8 illustrates a modification of the invention illustrated in FIGURE 1. It differs principally from the embodiment of FIGURE 1 in that, instead of providing a single tube 20 having a plurality of orifices therein as shown in FIGURE 1, the system of FIGURE 8 employs a plurality of upstanding tubes 84, 86, and 88 each having a restricted bore as shown in connection with the tube 88. When tank 18 is full of fuel, the combined gas flow through each of the tubes 84, 86 and 88 is adequate to maintain normal operation of the engine under all speeds and loads. However, as the supply of fuel is decreased in auxiliary tank 18 as a result of the exhaustion of fuel in the main tank, the supply of fuel finally reaches a level wherein fuel can no longer be admitted to the tube 88 and fuel can then enter only through tubes 84 and 86. The combined fuel flow through the small bores of tubes 84 and 86 will only permit operation at some speed which is less than the maximum vehicle speed. Similarly, when the fuel supply drops still further, fuel can be admitted only through the open end of tube 84 and engine speed must then be still further reduced to maintain operation of the engine. At any time, as when an emergency situation arises, the vehicle operator may energize electromagnetic valve 24, thereby permitting unrestricted flow of fuel through the open upper end of tube 90 which is then provided with a quite large bore so that, with the valve 24 open, the supply of fuel that can be provided to the engine through gas line 26 is sufficient to maintain normal operation.

In FIGURE 9, the inlet pipe 16 supplies fuel from the main tank to auxiliary tank 18. Tank 18 has an upstanding pipe 92 therein which extends upwardly from the bottom wall of the tank to a region near the very top of the tank. An alternate fuel flow path is provided through tube 94 and through valve 24 to main gas line 26. Normally valve 24 is de-energized so that the flow of fuel through tube 94 is restricted and only a very slight amount of fuel can be provided through this path by reason of the small orifice 96 which is provided in valve member 98.

When tank 18 is full of fuel, an unrestricted flow of fuel is provided through tube 92 to the main gas line 26 and thence to the engine. However, when the supply of fuel in tank 18 drops to a level where fluid will no longer flow freely into tube 92, then a flow of fuel to the engine can only be provided through the minute orifice 96, and the bore of this orifice is designed to permit operation of the engine at only reduced speed. Here again, the amount of fuel which can flow through the orifice 96 is dependent upon the pressure head of fuel in tank 18 which is gradually reduced as the supply of fuel is diminished. The vehicle operator may at any time, however, energize valve 24 thereby raising the valve member 98 and permitting an unrestricted flow of fuel from tank 18 into the main gas line 26. Preferably, as with the previous embodiments, energization of valve 24 is accompanied by the flashing of a distinctive signal to the driver.

FIGURE 10 illustrates a modification of the invention which permits conversion of the conventional main fuel tank of the vehicle to provide a reserve fuel supply therein without the need of constructing separa'e compartments, baffles, or valves in such tank. The novel element comprises a member 100 which is in the form of a hollow tube having a mounting flange 102, gasket 104, and sheet metal screws 106. The upper end of tube 100 is cut at a sharp angle to the longitudinal axis of the tube to thereby provide a pointed sharp portion 108 which is sufficiently sharp to facilitate the insertion of the entire element 100 into the bottom of an existing gas tank merely by driving it through the sheet metal bottom of the tank in much the same manner that a filler spout is inserted into the top of an oil can. After its insertion, the element 100 is secured in place by means of the sheet metal screws 106, and the gasket 104 provides a sealing relationship to prevent any fuel leakage.

The element 100 is provided with a small orifice 110 which permits only a restricted flow of fuel therethrough into the interior of the hollow tube 100. Under normal conditions, when an adequate supply of fuel remains in the main gas fuel tank 10, any desired quantity of fuel may be drawn from the tank and through the open upper end of tube 100. However, when the fuel level drops below the open upper end of tube 100, further flow of fuel to the engine can take place only through the restricted orifice 110 so that engine speed must be reduced if the engine is to continue operation. The fuel remaining in the tank then may nevertheless be used, but only with restricted vehicle speeds, thereby ensuring that the operator will immediately attend to the situation by having the tank filled. In any event, although engine operation is immediately impaired, the vehicle is not completely stalled and can still make its way to the nearest filling station even though it must do so at reduced speed.

Although the foregoing description of the embodiment of FIGURE 10 has been concerned particularly with a retrofit installation, it should be kept in mind that this form of the invention is equally well suited for use in an original installation. In that event, it may be feasible to eliminate the pointed upper end 108 of tube 110 since, presumably, a suitable aperture would then be provided in tank 10 to receive tube 100.

Several embodiments of our invention for a reserve fuel supply system have been described herein. It should be understood that various modifications, adaptations and alterations may be made to the specific forms shown without in any manner departing from the spirit and scope of this invention. In particular, although electromagnetic valves have been shown in several of the embodiments of our invention, it is to be understood that mechanically or manually operated valves may be used instead.

What we claim is:

1. A fuel supply system for the engine of a motor vehicle or the like having a conventional fuel pump comprising,
   a main fuel tank,
   an auxiliary fuel tank,
   means for conducting fuel from said main tank to said auxiliary tank,
   means for conducting fuel from said auxiliary tank to said engine,
   and a second selectively operable pump means for pumping fuel from the bottom of said auxiliary tank to the engine downstream of said first-named pump.

2. A fuel supply system for the engine of a motor vehicle or the like comprising,
   a fuel tank,
   first means in said tank for providing a substantially unrestricted flow of fuel from the said tank to said engine only when said tank is substantially full of fuel and for inhibiting the flow of fuel to said engine when said tank is not substantially full of fuel,
   second means for at times permitting a substantially unrestricted flow of fuel to said engine from said tank even when said tank is not substantially full of fuel,
   said second means including an upstanding fuel conducting tube opening into said tank near the bottom thereof and valve means for selectively controlling the flow of fuel from said tank to said engine,
   said first means comprising a hollow open-ended upstanding tube in said tank extending from adjacente the bottom of said tank with said open end adjacent the top of said tank and at least one orifice in said tube for admitting a limited supply of fuel to the hollow interior of said tube,
   said upstanding tube of said second means having an open end which is positioned in said tank below the level of the bottommost of said orifices in said tube included in said first means,
   said upstanding tube included in said second means having a restricted orifice in its side wall near the bottom of said tank.

3. The fuel supply system as in claim 2 in which said tank is substantially in the form of a rectangular parallelepiped and both said tubes included respectively in said first and second means extend substantially parallel to each other from adjacent one edge of one interior surface of said tank toward the opposite edge of the opposite surface.

4. A fuel supply system for the engine of a motor vehicle or the like comprising,
   a fuel tank,
   first means in said tank for providing a substantially unrestricted flow of fuel from said tank to said engine only when said tank is substantially full of fuel and for inhibiting the flow of fuel to said engine when said tank is not substantially full of fuel,
   second means for at times permitting a substantially unrestricted flow of fuel to said engine from said tank even when said tank is not substantially full of fuel,
   said second means including an upstanding fuel conducting tube opening into said tank near the bottom thereof and valve means for selectively controlling the flow of fuel from said tank to said engine,
   control means for selectively energizing said valve,
   said first means comprising a tube within said tank and having an open end adjacent the tube of said tank so that the open end of said tube is submerged in fuel only when said tank is substantially full,
   said valve defining a restricted orifice therethrough even when said valve is closed,
   whereby a limited supply of fuel is supplied to said engine when the level of said fuel in said tank falls below the level of the open end of said tube.

5. A fuel supply system for the engine of a motor vehicle or the like comprising,
   a fuel tank,
   first means in said tank for providing a substantially unrestricted flow of fuel from said tank to said engine only when said tank is substantially full of fuel and for inhibiting the flow of fuel to said engine when said tank is not substantially full of fuel,
   second means for at times permitting a substantially unrestricted flow of fuel to said engine from said tank even when said tank is not substantially full of fuel,
   said second means including an upstanding fuel conducting tube opening into said tank near the bottom thereof and valve means for selectively controlling the flow of fuel from said tank to said engine,
   said first means comprising a first open ended tube extending downwardly into said tank and an additional tube which substantially surrounds said first tube except for its open end and which is positioned adjacent the top of said tank and at least one restricted orifice adjacent the bottom of said auxiliary tank, said additional tube having also an opening near its bottom end which is normally closed by a valve comprising a part of said second means.

6. A fuel supply system for the engine of a motor vehicle or the like comprising,
a fuel tank,
first means in said tank for providing a substantially unrestricted flow of fuel from said tank to said engine only when said tank is substantially full of fuel and for inhibiting the flow of fuel to said engine when said tank is not substantially full of fuel,
second means for at times permitting a substantially unrestricted flow of fuel to said engine from said tank even when said tank is not substantially full of fuel,
said second means including an upstanding fuel conducting tube opening into said tank near the bottom thereof and valve means for selectively controlling the flow of fuel from said tank to said engine,
said first means comprising a plurality of upstanding tubes in said tank whose open ends terminate at respectively different distances from the top of said tank, each said tube having a restricted bore for the passage of fuel to said engine, whereby upon the lowering of the fuel level in said tank successively fewer of said upstanding tubes have their open ends below the level of said fuel thereby increasingly restricting the supply of fuel to said engine.

7. An adapter for a fuel tank supplying fuel to an engine comprising,
a hollow tube adapted to be inserted through a wall of said tank and extending upwardly into said tank with its open end a predetermined distance from the bottom of said tank,
said tube being cut at its open end at an acute angle to its axis to provide thereby a sharp pointed end so as to permit forcible insertion of said tube through the sheet metal from a said tank,
said tube having at least one restricted orifice in its side wall adjacent the bottom of said tank,
and means for conducting fuel which enters the hollow interior of said tube exteriorly of said tank.

8. A fuel supply system for the engine of a motor vehicle of the like comprising,
a fuel tank,
first means comprising at least one upstanding tube within said tank having an open upper end adjacent the top of said tank for conducting fuel to said engine at any rate demanded by said engine,
means for permitting the flow of fuel from said tank to said engine only at a restricted rate when the fuel level in said tank falls below the level of the open upper end of said tube and until the level of fuel falls below a still lower predetermined level,
and means including a valve for blocking all flow of fuel from said tank to said engine upon a drop in fuel level below said pre-determined level except when said valve is open.

References Cited

UNITED STATES PATENTS

| | | | |
|---|---|---|---|
| 1,470,775 | 10/1923 | Stephens | 158—46.5 |
| 1,570,010 | 1/1926 | Snowcroft | 158—46.5 |
| 2,734,561 | 2/1956 | Funkhouser | 158—46.5 X |
| 2,745,478 | 5/1956 | Arens et al. | 158—46.5 |
| 3,316,891 | 5/1967 | McKay | 158—46.5 X |

ROBERT B. REEVES, *Primary Examiner.*

HADD S. LANE, *Examiner.*